US012803793B2

(12) United States Patent
Ikarashi

(10) Patent No.: US 12,803,793 B2
(45) Date of Patent: Nov. 17, 2026

(54) SECURE INVERSE SQUARE ROOT COMPUTATION SYSTEM, SECURE NORMALIZATION SYSTEM, METHODS THEREFOR, SECURE COMPUTATION APPARATUS, AND PROGRAM

(71) Applicant: NTT, Inc., Tokyo (JP)

(72) Inventor: Dai Ikarashi, Musashino (JP)

(73) Assignee: NTT, Inc., Tokyo (JP)

( * ) Notice: Subject to any disclaimer, the term of this patent is extended or adjusted under 35 U.S.C. 154(b) by 1152 days.

(21) Appl. No.: 17/791,211

(22) PCT Filed: Jan. 20, 2020

(86) PCT No.: PCT/JP2020/001675

§ 371 (c)(1),
(2) Date: Jul. 7, 2022

(87) PCT Pub. No.: WO2021/149099

PCT Pub. Date: Jul. 29, 2021

(65) Prior Publication Data

US 2023/0038504 A1 Feb. 9, 2023

(51) Int. Cl.
*H04L 9/08* (2006.01)
*G06F 7/552* (2006.01)

(52) U.S. Cl.
CPC .............. *H04L 9/085* (2013.01); *G06F 7/552* (2013.01); *G06F 7/5525* (2013.01); *H04L 2209/46* (2013.01)

(58) Field of Classification Search
CPC ....... G06F 7/552; G06F 7/5525; H04L 9/085; H04L 2209/46
See application file for complete search history.

(56) References Cited

U.S. PATENT DOCUMENTS

2018/0373834 A1 12/2018 Cho et al.

OTHER PUBLICATIONS

Dimitrov, V., Kerik, L., Krips, T., Randmets, J., & Willemson, J. (Aug. 12, 2016). Alternative implementations of secure real numbers. IACR Cryptology ePrint Archive. https://eprint.iacr.org/2016/773 (Year: 2016).*

(Continued)

*Primary Examiner* — Emily E Larocque
*Assistant Examiner* — Jerome Anthony Klosterman, II
(74) *Attorney, Agent, or Firm* — XSENSUS LLP

(57) ABSTRACT

The bit decomposition unit (11) generates a bit representation lap $\{a_0\}, \ldots, \{a_{\lambda-1}\}$ of a. A first bit sequence generator (12) calculates $\{a'_i\}=\{a_i\}\vee\{a_{i+1}\}$ to generate $\{a'_0\}, \ldots, \{a'_{\lambda'-1}\}$. A flag sequence generator (13) generates $\{x_0\}, \ldots, \{x_{\lambda'-1}\}$ indicating a most significant bit of $\{a'_0\}, \ldots, \{a'_{\lambda'-1}\}$. A normalization multiplier generator (14) generates [c'] by bit-connecting $\{x_{\lambda'-1}\}, \ldots, \{x_0\}$. A second bit sequence generator (15) sets $\{a''_i\}=\{a_{2i}\}$ to generate $\{a''_0\}, \ldots$. A flag calculator (16) sums $\{x_j\}\{a'_j\}$ to calculate a share value {r}. A normalization unit (18) calculates [b]: =[c'][c'][2*a*] when r=1 and [b]: =[c'][c'][a] when r=0. A inverse square root calculator (19) calculates [w]: =[1/√*b*]*√2 when r=1, and [w]: =[1/√b] when r=0. An inverse normalization unit (20) multiplies [1/√a]: =[w][c'].

4 Claims, 6 Drawing Sheets

SECURE INVERSE SQUARE ROOT COMPUTATION METHOD

(56) References Cited

OTHER PUBLICATIONS

Ikarashi, "Secure Real numbers Operations for Secure AI—O(|p|)-Bit Communication and O(1)-Round Right Shift Protocol-", CSS2019, 2019, 16 pages including English Translation.
Manuel Liedel Ed—Mark D Ryan et al: "Secure Distributed Computation of the Square Root and Applications", Apr. 9, 2012 (Apr. 9, 2012), Information Security Practice and Experience, Springer Berlin Heidelberg, Berlin, Heidelberg, pp. 277-288, XP019175207.

* cited by examiner

SECURE INVERSE SQUARE ROOT COMPUTATION SYSTEM, SECURE NORMALIZATION SYSTEM, METHODS THEREFOR, SECURE COMPUTATION APPARATUS, AND PROGRAM

CROSS-REFERENCE TO RELATED APPLICATION

The present application is based on PCT filing PCT/JP2020/001675, filed Jan. 20, 2020, the entire contents of which are incorporated herein by reference.

TECHNICAL FIELD

The present invention relates to a technology for calculating the inverse of a square root in secure computation.

BACKGROUND ART

Secure computation is a cryptographic technology for calculating any function while hiding data. A data utilization form is expected to be developed taking advantage of this feature so that data does not leak to either a system operator or a data user. There are several schemes for secure computation, and among them, the schemes including secret sharing as a component are known to have a small data processing unit and be able to perform high-speed processing.

Secret sharing is a method of converting secret information into several fragments called shares. For example, there is secret sharing called a (k, n) threshold method in which n shares are generated from the secret information and secrets can be restored from k or more shares, and thus, secret information is not leaked as long as the number of shares to restore the secret information is smaller than k. Shamir secret sharing, duplicate secret sharing, and the like are known as specific methods for configuring secret sharing. In the present specification, one fragment of a value shared by secret sharing is referred to as "share". Further, an entire set of all shares is called a "share value".

In recent years, research on advanced statistics or machine learning using secure computation has been actively performed. However, most of calculations thereof include calculations of an inverse, a square root, an exponent, a logarithm, and the like, going beyond calculations good for secure computation such as addition, subtraction, and multiplication. Calculation of the inverse of a square root is one of basic calculations in a computer or the like, and is used in various situations. NPL 1 discloses a method of calculating the inverse of a square root in secure computation. Further, various function calculations including a square root may require processing for performing normalization so that a numerical value falls in a certain range. In the secure computation, normalization of a numerical value is performed by moving a most significant bit (msb).

CITATION LIST

Non Patent Literature

NPL 1: Dai Ikarashi. "Secure Real Number Operations for Secure AI-O(|p|)-Bit Communication and O(1)-Round Right Shift Protocol-", CSS2019, 2019

SUMMARY OF THE INVENTION

Technical Problem

However, a method disclosed in NPL 1 is computationally expensive.

An object of the present invention is to provide a secure computation technology capable of calculating the inverse of a square root at high speed in view of the technical difficulty as described above.

Means for Solving the Problem

In order to solve the above problems, a secure inverse square root computation system according to a first aspect of the present invention is a secure inverse square root computation system for receiving a share value [a] of a value a as an input, and calculating a share value [1/√a] of the inverse of the square root of the value a. The secure inverse square root computation system includes a plurality of secure computation apparatuses. $\lambda$ is a decimal point position of the value a, $\lambda'$ is the smallest integer equal to or greater than $\lambda/2$, and $\lambda''$ is the largest integer equal to or smaller than $\lambda/2$. Each of the plurality of secure computation apparatus includes a bit decomposition unit configured to generate a first sequence of share values $\{a_0\}, \ldots, \{a_{\lambda-1}\}$ of a bit representation $a_0, \ldots, a_{\lambda-1}$ of the value a from the share value [a]; a first bit sequence generation unit configured to obtain share values $\{a'_i\}$ of a bit $a'_i$ by calculating a logical sum of share values $\{a_i\}$ and share values $\{a_{i+1}\}$ of the first sequence of share values to generate a second sequence of share values $\{a'_0\}, \ldots, \{a'_{\lambda'-1}\}$ of a bit sequence $\{a'_0\}, \ldots, \{a'_{\lambda-1}\}$ where i is an integer equal to or greater than 0 and smaller than $\lambda''$; a flag sequence generation unit configured to generate a third sequence of share values $\{x_0\}, \ldots, \{x_{\lambda'-1}\}$ of a flag sequence $x_0, \ldots, x_{\lambda'-1}$ indicating the most significant bit of the second sequence of share values $\{a'_0\}, \ldots, \{a'_{\lambda'-1}\}$; a normalization multiplier generation unit configured to generate a share value [c'] of a normalization multiplier c' obtained by bit-connecting the third sequence of share values $\{x_0\}, \ldots, \{x_{\lambda'-1}\}$ in reverse order, a second bit sequence generation unit configured to set share values $\{a_{2i}\}$ of the first sequence of share values as share values $\{a''_i\}$ of bits $a''_i$ to generate a fourth sequence of share values $\{a''_0\}, \ldots, \{a''_{\lambda'-1}\}$ of a bit sequence $a''_0, \ldots, a''_{\lambda'-1}$ where i is an integer equal to or greater than 0 and smaller than $\lambda''$; a flag calculation unit configured to sum products of share values $\{x_j\}$ of the third sequence of share values and share values $\{a''_j\}$ of the fourth sequence of share values to calculate a share value {r} of a multiplication flag r where j is an integer equal to or greater than 0 and smaller than $\lambda'$; a normalization unit configured to use the share value [a], the share value [c'], and the share value {r} to calculate [c'][c'][2a] when r=1 and [c'][c'][a] when r=0 to calculate a share value [b]; an inverse square root calculation unit configured to use the share value [b] and the share value [r] to calculate [1/√b]*√2 when r=1 and [1/√b] when r=0 to calculate a share value [w]; and an inverse normalization unit configured to calculate the share value [1/√a] by multiplying the share value [w] by the share value [c'].

A secret normalization system according to a second aspect of the present invention is a secure normalization system for normalizing a share value [a] of a value a in order to calculate a share value [1/√a] of the inverse of the square root of the value a. The secure normalization system includes a plurality of secure computation apparatuses. $\lambda$ is a decimal point position of the value a, $\lambda'$ is the smallest integer equal to or greater than λ/2, and λ" is the largest integer equal to or smaller than λ/2. Each of the secure computation apparatuses includes a bit decomposition unit configured to generate a first sequence of share values $\{a_0\}, \ldots, \{a_{\lambda-1}\}$ of a bit representation $a_0, \ldots, a_{\lambda-1}$ a from the share value [a]; a first bit sequence generation unit configured to obtain share values $\{a'_i\}$ of bits $a'_i$ by calculating a logical sum of share values $\{a_i\}$ and share values $\{a_{i+1}\}$ of the first sequence of share values to generate a second sequence of share values $\{a'_0\}, \ldots, \{a'_{\lambda'-1}\}$ of a bit sequence $a'_0, \ldots, a'_{\lambda'-1}$ where i is an integer equal to or greater than 0 and smaller than λ"; a flag sequence generation unit configured to generate a third sequence of share values $\{x'_0\}, \ldots, \{x'_{\lambda'-1}\}$ of a flag sequence $x_0, \ldots, \lambda_{\lambda'-1}$ indicating the most significant bit of the second sequence of share values $\{a'_0\}, \ldots, \{a'_{\lambda'-1}\}$; a normalization multiplier generation unit configured to generate a share value [c'] of a normalization multiplier c' obtained by bit-connecting the third sequence of share values $\{x_0\}, \ldots, \{x_{\lambda'-1}\}$ in reverse order; a second bit sequence generation unit configured to set share values $\{a_{2i}\}$ of the first sequence of share values as share values $\{a''_i\}$ of bits $a''_i$ to generate a fourth sequence of share values $\{a''_0\}, \ldots, \{a''_{\lambda'-1}\}$ of a bit sequence $a''_0, \ldots, a''_{\lambda'-1}$ where i is an integer equal to or greater than 0 and smaller than λ"; a flag calculation unit configured to sum products of share values $\{x_j\}$ of the third sequence of share values and share values $\{a''_j\}$ of the fourth sequence of share values to calculate a share value {r} of a multiplication flag r where j is an integer equal to or greater than 0 and smaller than λ'; and a normalization unit configured to use the share value [a], the share value [c'], and the share value {r} to calculate [c'][c'][2a] when r=1 and [c'][c'][a] when r=0 to calculate a share value [b].

Effects of the Invention

According to the present invention, it is possible to calculate the inverse of a square root at high speed in secure computation.

DESCRIPTION OF EMBODIMENTS

Figure 1:
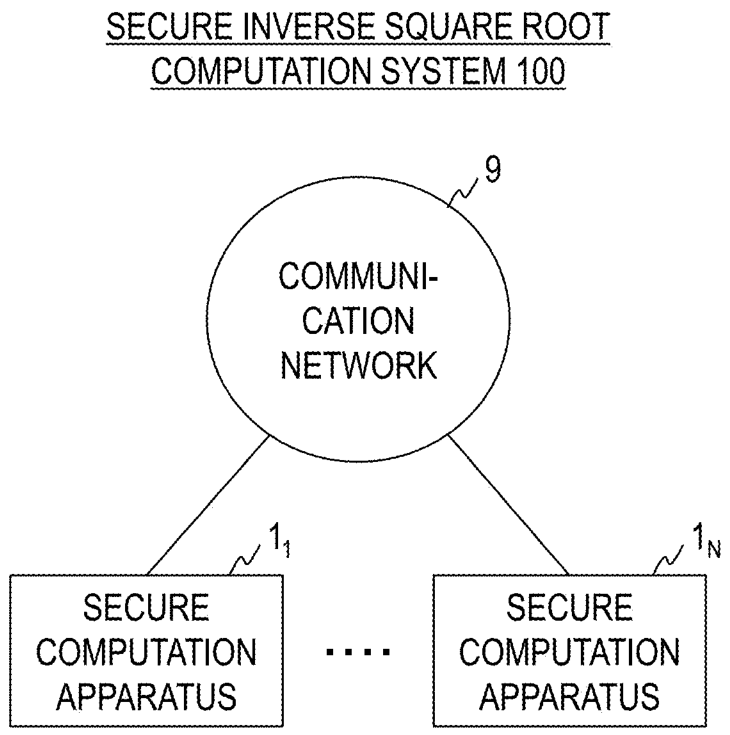
FIG. 1 is a diagram illustrating a functional configuration of a secure inverse square root computation system.

Hereinafter, embodiments of the present invention will be described in detail. In the drawings, components having the same function are denoted by the same numbers, and duplicate description thereof will be omitted.

In the present specification, the following notation is used.

[•] is data in which a numerical value • is hidden. For example, share values of Shamir secret sharing, duplicate secret sharing, or the like can be used.

{•} is data in which a bit • is hidden. For example, a share value of replication secret sharing on $Z_2$, or the like can be used.

λ denotes a decimal point position. About a half of the number [p] of bits of a ring or a field used for secure computation is assumed.

[a?b:c] represents b when a=1 and c when a=0.

$$\neg, \wedge, \vee, \oplus \qquad \text{[Math. 1]}$$

Symbols described above indicate a logical negation (NOT), a logical product (AND), a logical sum (OR), and an exclusive OR (XOR), respectively.

An integer in a ring can be regarded as a fixed-point real number by setting a public decimal point position for the integer. In the present invention, the fixed-point real number represented in the ring in this way is simply referred to as a real number.

Embodiment: Secure Inverse Square Root Computation System

An embodiment of the present invention is a secure inverse square root computation system and method in which a share value [a] of a value a is an input and a share value [1/√a] of the inverse of a square root of the value a is calculated with the value a hidden. Hereinafter, an overview of an inverse square root protocol executed by the secure inverse square root computation system of the embodiment will be described.

In the related art, in secure computation, a group of elementary functions such as an inverse, a square root, an exponential function, and a logarithm function that go beyond addition, subtraction, and multiplication has a high processing cost and has not been implemented. In order to solve these problems, the present invention enables the inverse of a square root to be efficiently calculated using an algorithm that can efficiently and uniformly approximate the group of elementary functions in the secure computation. With this approximation scheme, it is possible to approximate major elementary functions including the inverse of a square root simply by changing parameters with a single scheme. Further, this approximation scheme is an amount of communication/the number of rounds for three real number multiplications in single precision (23 bits), which is a theoretically optimized efficiency.

The inverse of a square root can be applied to a case in which an optimization scheme Adam or the like in machine learning is introduced into secure computation. In calculation of the inverse of a square root for plaintext, the following normalization may be performed for efficient calculation. A difference between a position of a digit of 0.5 (that is, $2^{-1}$) at a decimal point position of an input a and a most significant bit (msb) of the input a is set as e, and the following modification is performed. That is, the input a is multiplied by $2^c$ for normalization to an interval [0.5, 1), and the inverse of a square root $1/\sqrt{(2^c a)}$ is obtained and then multiplied by $\sqrt{2^c}$.

$$\frac{1}{\sqrt{a}} = \sqrt{2^e}\frac{1}{\sqrt{2^e a}} \qquad \text{[Math. 2]}$$

In NPL 1, in order to obtain a value [c] of a power of 2 to be multiplied by for normalization, a protocol for additionally obtaining [√c] for a protocol for matching the most significant bit was executed. However, the evaluation of processing costs revealed that it was more efficient to calculate [√c] first and then square [√c] to obtain [c]. Thus, in the present invention, an inverse square root protocol disclosed in NPL 1 is modified so that [√c] is calculated first and then squared to obtain [c].

An algorithm for approximating a group of elementary functions in the secure computation with an eighth degree polynomial is shown hereinafter.

Algorithm 1: Function Approximation Protocol using Eighth Degree Polynomial

Input: [x] ∈ [L, R)

Parameters: a, b, c, d, f, g, H, i, j, k, l, m, n, o, p, q, α, β, γ, δ, and ζ

Output: [func (x)] corresponding to a target function func

1: Calculate [y']: =[x(δx+a−i)−j] using a sum of products, and lower a decimal point position by right shift.
2: Calculate [y]: =[y'+(ix+j)].
3: Calculate [z']: =[yζy+b−k)+(c−1)x−m] by sum of products, and lower the decimal point position by right shift.
4: Calculate [z]: =[z'+(ky+lx+m)].
5: Calculate [w'/γ]: =[z(αz+d−n/γ)+(βx+f−o/γ) y+(g−p)x+(H−q)/γ] by sum of products, and perform multiplication by γ and lowering a decimal point position at the same time to obtain [w'].
6: Output [w]: =[w'+(nz+oy+px+q)].

The lowering of the decimal point position executed in steps 1 and 3 of algorithm 1 can be efficiently performed by using, for example, a public divisor division disclosed in NPL 1.

Simultaneous execution of the public value multiplication and lowering of the decimal point executed in step 5 of algorithm 1 can be efficiently performed by using, for example, the following algorithm.

Algorithm 2: Multiplication of Public Value at Same Time without Increasing Processing Cost from Right Shift Input: [x], multiplier m, shift amount σ

Output: [mx] after shift

1: Calculate a public value $2^\sigma/m$.
2: Calculate the following equation through public value division. Here, [mx] is regarded as an expression the decimal point position of which is σ lower than that of [x].

$$\frac{[x]}{\frac{2^\sigma}{m}} = \lfloor mx \rfloor \quad \text{[Math. 3]}$$

Parameters L, R, a, b, c, d, f, g, H, i, j, k, l, m, n, o, p, q, α, β, γ, δ, and ζ used in algorithm 1 are set according to the approximate function func. When a function for obtaining the inverse of a square root, which is a target in the present invention, is approximated, the respective parameters are set as shown in the following table, for example. Note that $e_x$, $e_y$, $e_z$, and $e_w$ are decimal point positions of x, y, z, and w, and $e'_y$, $e'_z$, and $e'_w$ are decimal point positions of y', z', and w'. These are parameters that determine an amount of right shift in eighth degree polynomial approximation. For example, the amount of right shift when y is calculated from y' is $e'_y - e_y$.

TABLE 1

| | | | |
|---|---|---|---|
| L | 0.5 | α | 3.0 |
| R | 1 | β | −0.5 |
| a | −1.696628555353 | $\gamma^{-1}$ | 1.03163474573752 |
| b | 1.5495740937688 | δ | 1 |
| c | −0.110156883654384 | ξ | 1 |

TABLE 1-continued

| | | | |
|---|---|---|---|
| d | 4.69745708853176 | $e_x$ | 28 |
| f | 0.910418285014127 | $e_y$ | 30 |
| g | −0. 959053601554654 | $e_z$ | 30 |
| H | 3.97129059909928 | $e_w$ | 28 |
| i | −0.25 | $e'_y$ | 62 |
| j | −0.523183544290677 | $e'_z$ | 63 |
| k | 0 | $e'_w$ | 60 |
| l | −0.25 | | |
| m | −0.503025809551099 | | |
| n | 0 | | |
| o | 0 | | |
| p | 0 | | |
| q | −2.97129059909928 | | |

An algorithm for calculating the inverse of a square root in the secure computation using algorithm 1 is shown hereafter. Here, an algorithm for normalizing an input, which is a calculation target, for calculation of the inverse of a square root (algorithm 3) and an algorithm for calculating the inverse of the square root using algorithm 3 (algorithm 4) will be described separately.

Algorithm 3: Normalization Protocol for Inverse of Square Root

Input: [a]

Output: [b], [r], [c'] (where b is a value obtained by moving a most significant bit of a to a position of λ−1 (that is, a value obtained by normalizing a to [0.5, 1)); r is a truth value indicating whether a calculation result is multiplied by √2; c' is a number of a power of 2 that is used for normalization and an inverse calculation thereof.)

1: Obtain a bit representation $\{a_0\}, \ldots, \{a_{\lambda-1}\}$ of [a] through bit decomposition.
2: Set λ' and λ" using the following equation. That is, let λ' be the smallest integer equal to or greater than λ/2, and let λ" be the largest integer smaller than or equal to λ/2.

$$\lambda' := \left\lceil \frac{\lambda}{2} \right\rceil, \lambda'' := \left\lfloor \frac{\lambda}{2} \right\rfloor \quad \text{[Math. 4]}$$

3: Under 0≤i<λ", assume $\{a'_i\}: =\{a_i \vee a_{i+1}\}$. That is, a logical sum of $\{a_i\}$ and $\{a_{i+1}\}$ is calculated.
4: When λ is an odd number, assume $\{a'_{\lambda'-1}\}: =\{a_{\lambda-1}\}$.

Here, a' is a bit sequence indicating an integer obtained by connecting 2 bits of a by OR.

5: Obtain a bit sequence $\{x_0\}, \ldots, \{x_{\lambda'-1}\}$ in which only the value at a position of the most significant bit of a' is 1.
6: Combine $\{x_{\lambda'-1}\}, \ldots, \{x_0\}$ through bit combination to obtain [c'].
7: Under 0≤i<λ", assume $\{a''_i\}:=\{a_{2i}\}$.
8: When λ is an odd number, assume $\{a''_{\lambda'-1}\}: =\{a_{\lambda-1}\}$.

Here a" is a bit sequence in which even-numbered bits of a (0 start notation) are arranged.

9: Calculate a sum of products $\{r\}: =\{x_0 a''_0 + \ldots + x_{\lambda'-1} a''_{\lambda'-1}\}$.

Here, r is a truth value indicating whether msb is in the even-number bit.

10: Change {r} to [r] through mod p conversion.
11: Calculate [b]: =[c'][c'][r?2a:a] and output [b], [r], and [c'].

Algorithm 4: Inverse Square Root Protocol
Input: [a]
Output: [1/√a]
1: Obtain the value [b] obtained by normalizing [a] to [0.5, 1), and [c'] and [r] required for inverse calculation of normalization using algorithm 3.
2: Execute algorithm 1 for [b] and calculate the inverse of the square root of [b]. In this case, for multiplication of a public value γ performed in step 5 of algorithm 1, selective public multiplication is executed with a condition being [r] and options being √2γ and γ, and [w'/γ]*γ*[r?√2:1] is calculated. A result is [w].
3: Calculate [w][c'].

The generation of the flag sequence indicating the most significant bit executed in step 5 of algorithm 3 can be efficiently performed by using, for example, the following algorithm.

Algorithm 5: MSB Flag Sequence Acquisition Protocol
Input: Bit-represented integer $\{a_0\}, \ldots, \{a_{\lambda-1}\}$
Output: Bit sequence $\{x_0\}, \ldots, \{x_{\lambda-1}\}$ in which only the value at the position of the msb of a is 1.
1: Under $0 \le i < \lambda-1$, assume $\{f_i\}: =\{f_{i+1} \vee a_i\}$.
2: Assume $\{f_{\lambda-1}\}: =\{a_{\lambda-1}\}$. Here, $\{f_0\}, \ldots, \{f_{\lambda-1}\}$ is a bit sequence in which 0s and 1s are lined up with msb as a boundary, such as 0, 0, 0, 1, 1, 1, . . . , 1.
3: Under $0 \le i < \lambda-1$, assume $\{x_i\}:=\{f_i \text{XOR } f_{i+1}\}$.
4: Assume $\{x_{\lambda-1}\}:=\{a_{\lambda-1}\}$. Here. $\{x_0\}, \ldots, \{x_{\lambda-1}\}$ is a bit sequence in which only the value at the position of msb is 1, such as 0, 0, 0, 1, 0, 0, . . . , 0.

The selective public multiplication executed in step 2 of algorithm 4 can be efficiently performed by using, for example, the following algorithm.

Algorithm 6: Multiplication of Required Right Shift Value by Selective Public Multiplier
Input: [a], multipliers $m_0$ and $m_1$, condition [c]
Output: $[m_1a]$ if c=1 and $[m_0a]$ if c=0
1: Calculate $[m_1a]$ and $[m_0a]$.
2: Output $[c?m_1a:m_0a]$ using an if-then-else gate.

The public value multiplication executed in step 1 of algorithm 6 can be efficiently performed, for example, by combining algorithm 2 with the following algorithm.

Algorithm 7: Right Shift in Plurality of Divisors/Public Divisor Division Input: [a], divisor $d_0, d_1, \ldots, d_{n-1}$
Output: $[a/d_0], [a/d_1], \ldots, [a/d_{n-1}]$
1: Obtain a quotient [q] of [a].
2: Use the quotient [q] to calculate and output $[a/d_i]$ for each i by right shift/public divisor division.

The quotient obtained in step 1 of algorithm 7 can be efficiently obtained through quotient transfer (see Reference 1).

Reference 1: Ryo Kikuchi, Dal Ikarashi, Takahiro Matsuda, Koki Hamada, and Koji Chide, "Efficient bit-decomposition and modulus-conversion protocols with an honest majority". Proceedings of Information Security and Privacy-23rd Australasian Conference (ACISP 2018), pp. 64-82, Jul. 11-13, 2018.

Secure Inverse Square Root Computation System 100

The secure inverse square root computation system 100 of the embodiment is an information processing system that executes the above inverse square root protocol. As illustrated in FIG. 1, the secure inverse square root computation system 100 includes N(≥3) secure computation apparatuses $\mathbf{1}_1, \ldots, \mathbf{1}_N$. In this embodiment, the secure computation apparatuses $\mathbf{1}_1, \ldots, \mathbf{1}_N$ are connected to a communication network 9. The communication network 9 is a circuit-switched or packet-switched communication network configured so that respective connected apparatuses can communicate with each other and, for example, the Internet, a local area network (LAN), a wide area network (WAN), or the like can be used. It is not necessary for each apparatus to be able to communicate online via the communication network 9. For example, information to be input to a secure computation apparatus $\mathbf{1}_n$ (n=1, . . . , N) may be stored in a portable recording medium such as a magnetic tape or a USB memory and input online from the portable recording medium to the secure computation apparatus $\mathbf{1}_n$.

Figure 2:
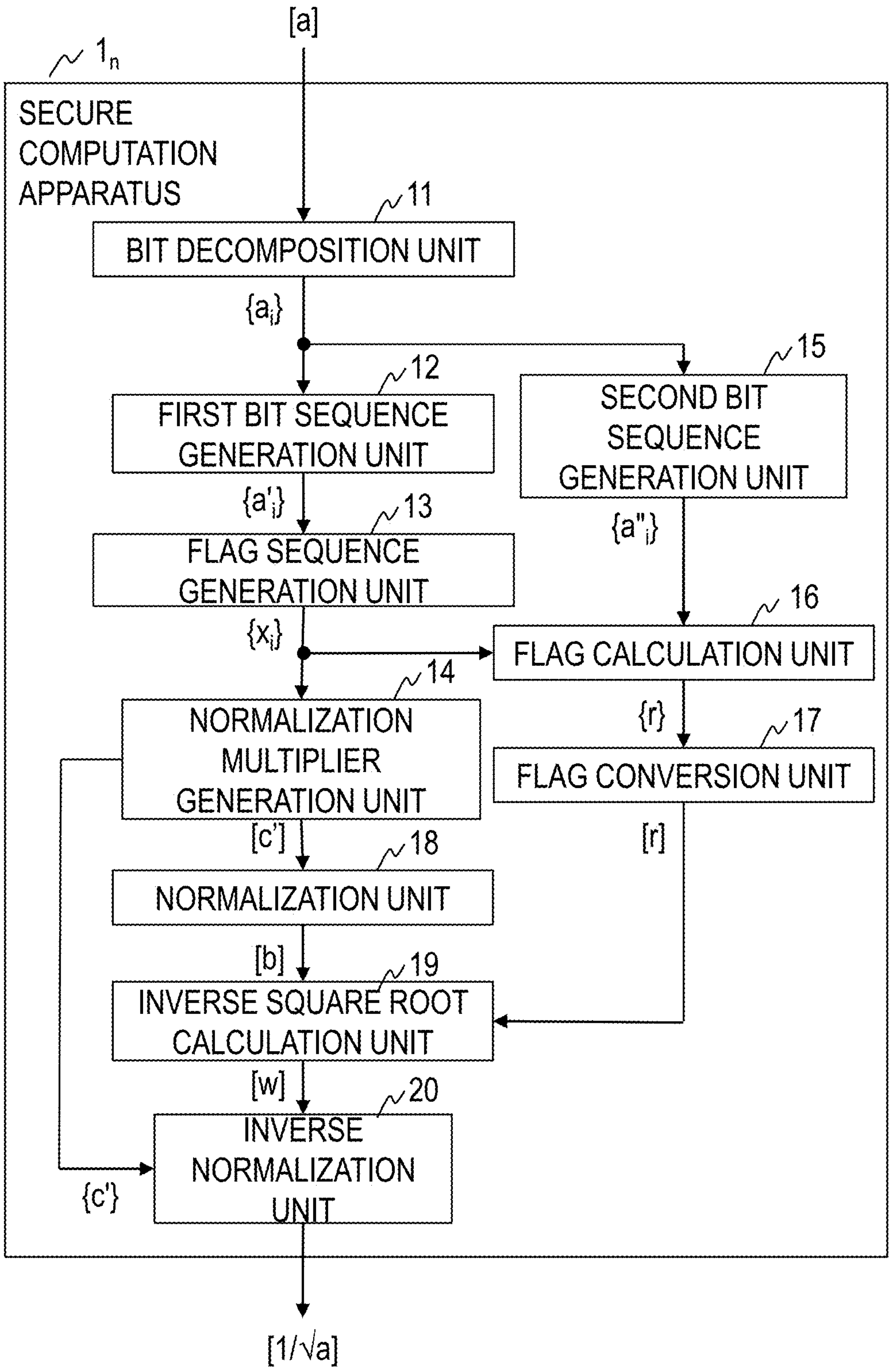
FIG. 2 is a diagram illustrating a functional configuration of a secure computation apparatus.
Figure 3:
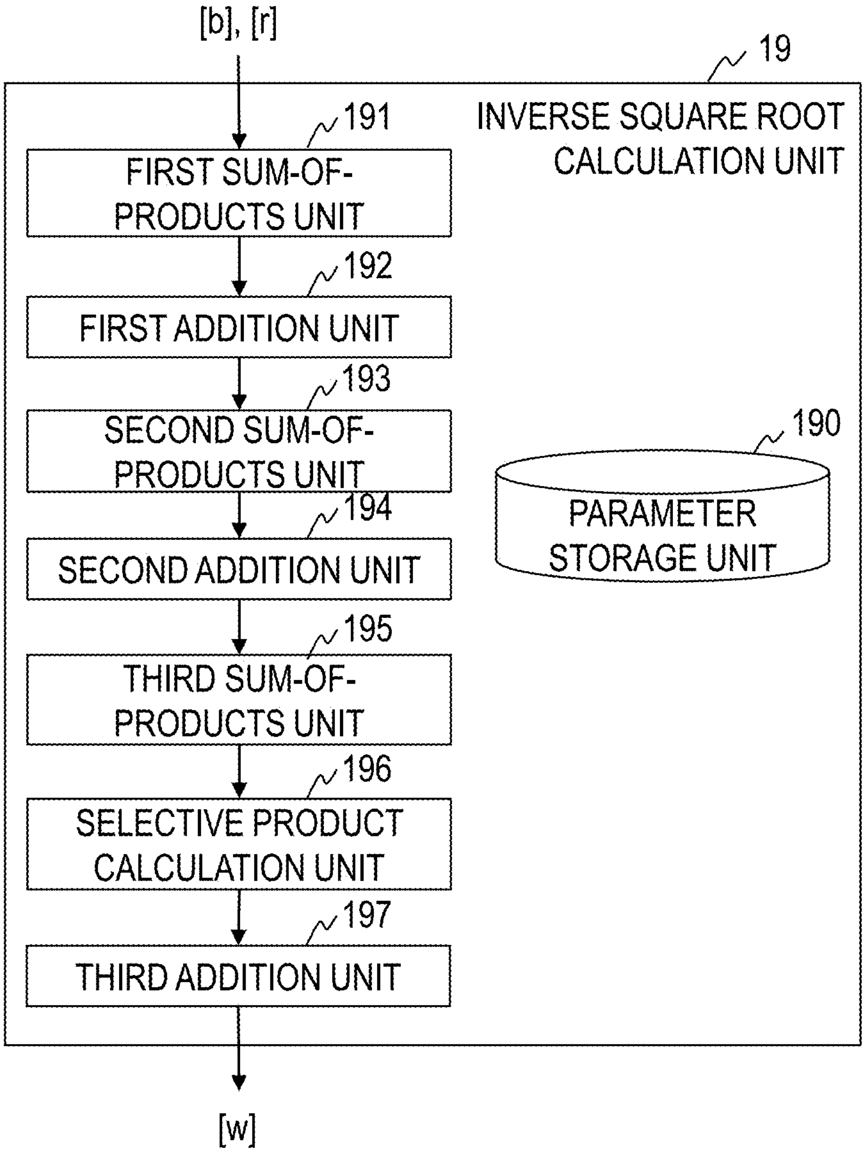
FIG. 3 is a diagram illustrating a functional configuration of an inverse square root calculation unit.

The secure computation apparatus $\mathbf{1}_n$ included in the secure inverse square root computation system 100 of the embodiment includes, for example, a bit decomposition unit 11, a first bit sequence generation unit 12, a flag sequence generation unit 13, a normalization multiplier generation unit 14, a second bit sequence generation unit 15, a flag calculation unit 16, a flag conversion unit 17, a normalization unit 18, an inverse square root calculation unit 19, and an inverse normalization unit 20, as illustrated in FIG. 2. The inverse square root calculation unit 19 includes, for example, a parameter storage unit 190, a first sum-of-products unit 191, a first addition unit 192, a second sum-of-products unit 193, a second addition unit 194, a third sum-of-products unit 195, a selective product calculation unit 196, and a third addition unit 197, as illustrated in FIG. 3. A secure inverse square root computation method of the embodiment is realized by the secure computation apparatus $\mathbf{1}_n$ performing processing of each step to be described below in cooperation with another secure computation apparatus $\mathbf{1}_{n'}$ (n'=1, . . . , N, where n≠n').

The secure computation apparatus $\mathbf{1}_n$ is a special apparatus configured by loading a special program into a publicly known or dedicated computer including, for example, a central processing unit (CPU), a main storage device (RAM: Random Access Memory), and the like. The secure computation apparatus $\mathbf{1}_n$ executes each process under the control of the central processing unit, for example. Data input to the secure computation apparatus $\mathbf{1}_n$ or data obtained by each processing is stored in, for example, the main storage device, and the data stored in the main storage device is read to the central processing unit as needed, and used for other processing. At least a part of each processing unit of the secure computation apparatus $\mathbf{1}_n$ may be configured by hardware such as an integrated circuit. Each storage unit included in the secure computation apparatus $\mathbf{1}_n$ can be configured of, for example, a main storage device such as a random access memory (RAM), an auxiliary storage device configured of a hard disk, an optical disc, or a semiconductor memory element such as a flash memory, or middleware such as a relational database or a key value store.

Figure 4:
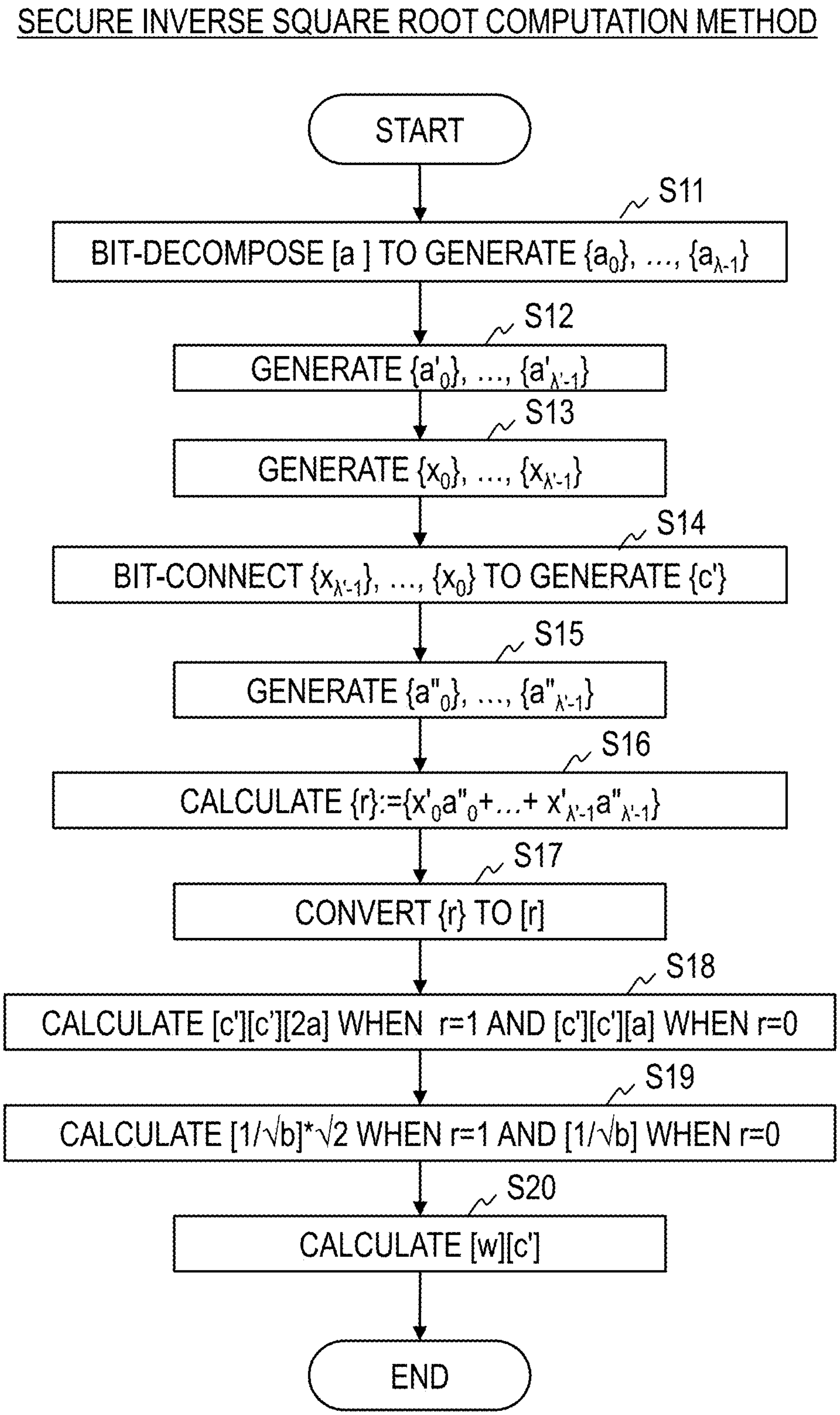
FIG. 4 is a diagram illustrating a processing procedure of a secure inverse square root computation method.

A processing procedure of the secure inverse square root computation method executed by the secure inverse square root computation system 100 of the embodiment will be described with reference to FIG. 4.

In step S11, the bit decomposition unit 11 of each secure computation apparatus $1_n$ decomposes the share value [a] of the value a input to the secure inverse square root computation system 100 into bits to obtain a sequence of the share value $\{a_0\}, \ldots, \{a_{\lambda-1}\}$ of the bit representation of the value a. The bit decomposition unit 11 outputs a sequence of share values $\{a_0\}, \ldots, \{a_{\lambda-1}\}$ to the first bit sequence generation unit 12 and the second bit sequence generation unit 15.

In step S12, the first bit sequence generation unit 12 of each secure computation apparatus $\mathbf{1}_n$ (uses the sequence of share values $\{a_0\}, \ldots, \{a_{\lambda-1}\}$ to generate a sequence of share values $\{a'_0\}, \ldots, \{a'_{\lambda'-1}\}$ of a bit sequence $a'_0, \ldots, a'_{\lambda'-1}$ that becomes $\{a'_i\}: =\{a_i \vee a_{i-1}\}$ where i<λ". Here, λ' is the smallest integer equal to or greater than λ/2, and λ" is the largest integer equal to or smaller than λ/2. That is, share values $\{a'_i\}$ of bits $a'_i$ obtained by calculating a logical sum of share values fad and share values $\{a_{i+1}\}$ are calculated where i is an equal to or greater than 0 and smaller than λ". Further, when λ is an odd number, $\{a'_{\lambda'-1}\}: =\{a_{\lambda-1}\}$ is assumed. The first bit sequence generation unit 12 outputs the sequence of share values $\{a'_0\}, \ldots, \{a'_{\lambda-1}\}$ to the flag sequence generation unit 13.

In step S13, the flag sequence generation unit 13 of each secure computation apparatus $1_n$ uses the sequence of share values $\{a'_0\}, \ldots, \{a'_{\lambda'-1}\}$ to generate a sequence of share values $\{x_0\}, \ldots, \{x_{\lambda'-1}\}$ of a flag sequence $x_0, \ldots, x_{\lambda'-1}$ a indicating a most significant bit of a value a'. The flag sequence indicating the most significant bit is, for example, a flag sequence in which only the value at the position of the most significant bit obtained by using the above algorithm 5 is 1. The flag sequence generation unit 13 outputs the sequence of share values $\{x_0\}, \ldots, (x_{\lambda'-1})$ to the normalization multiplier generation unit 14 and the flag calculation unit 16.

In step S14, the normalization multiplier generation unit 14 of each secure computation apparatus $1_n$ bit-connects the sequence of share values $\{x_0\}, \ldots, \{x_{\lambda'-1}\}$ in reverse order to generate a share value [c'] of the multiplier c' (hereinafter also referred to as a “normalization multiplier”) by which a calculation result is multiplied in order to perform normalization and an inverse calculation thereof. The normalization multiplier generation unit 14 outputs the share value [c'] to the normalization unit 18.

In step S15, the second bit sequence generation unit 15 of each secure computation apparatus $1_n$ uses the sequence of share values $\{a_0\}, \ldots, \{a_{\lambda-1}\}$ to generate a sequence of share values $\{a''_0\}, \ldots, \{a''_{\lambda-1}\}$ of a bit sequence $a''_0, \ldots, a''_{\lambda'-1}$ that becomes $\{a''_i\}:=[a_{2i}]$ where i<λ". That is, the share values $\{a_{2i}\}$ are set as share values $\{a''_i\}$ of bits $a''_i$ where i is an integer equal to or greater than 0 and smaller than λ". Further, when λ is an odd number, $\{a''_{\lambda'-1}\}: =\{a_{\lambda-1}\}$ is assumed. The second bit sequence generation unit 15 outputs the sequence of share values $\{a''_0\}, \ldots, \{a''_{\lambda'-1}\}$ to the flag calculation unit 16.

In step S16, the flag calculation unit 16 of each secure computation apparatus $1_n$ uses the sequence of share values $\{x_0\}, \ldots, \{x_{\lambda'-1}\}$ and $\{a''_0\}, \ldots, \{a''_{\lambda'-1}\}$ to calculate the share value [r] of the flag r (hereinafter also referred to as a “multiplication flag”) indicating whether a calculation result is multiplied by √2. Specifically, products of $\{x_i\}$ and $\{a''_i\}$ are summed where i is an integer equal to or greater than 0 and smaller than λ'. That is, $\{r\}: =\{x_0 a''_0 + \ldots + x_{\lambda'-1} a''_{\lambda'-1}\}$ is calculated. The flag calculation unit 16 outputs the share value [r] to the flag conversion unit 17.

In step S17, the flag conversion unit 17 of each secure computation apparatus $1_n$ converts the share value {r} of the multiplication flag r into the share value [r] through mod p conversion. The flag conversion unit 17 outputs the share value [r] to the inverse square root calculation unit 19.

In step S18, the normalization unit 18 of each secure computation apparatus $1_n$ uses the share value [a] of the value a, the share value [c'] of the normalization multiplier c', and the share value [r] of the multiplication flag r to calculate [c'][c'][2a] when r=1 and to calculate [c'][c'][a] when r=0 so that the share value [b] of the value b obtained by normalizing the value a is obtained. That is, [b]:=[c'][c'][r?2a:a] is calculated. The normalization unit 18 outputs the share value [b] to the inverse square root calculation unit 19.

In step S19, the inverse square root calculation unit 19 of each secure computation apparatus $1_n$ uses parameters for approximating an inverse square root function with an eighth degree polynomial to execute algorithm 1, so that the inverse of the square root is calculated for the share value [b] of the value b. In this case, multiplication of the public value γ performed in step 5 of algorithm 1 is performed by executing algorithm 6 with a condition being the share value [r] of the multiplication flag and options being √2γ and γ. That is, the inverse square root calculation unit 19 uses the share value [b] of the value b and the share value [r] of the multiplication flag r to calculate [1/√b]*√2 when r=1 and [1/√b] when r=0 to generate a share value [w] of a calculation result w. The inverse square root calculation unit 19 outputs the share value [w] to the inverse normalization unit 20.

In step S20, the inverse normalization unit 20 of each secure computation apparatus $1_a$ multiplies the share value [w] of the calculation result w by the share value [c'] of the normalization multiplier c' to output a share value [1/Ja] of an inverse of the square root of the value a.

Figure 5:
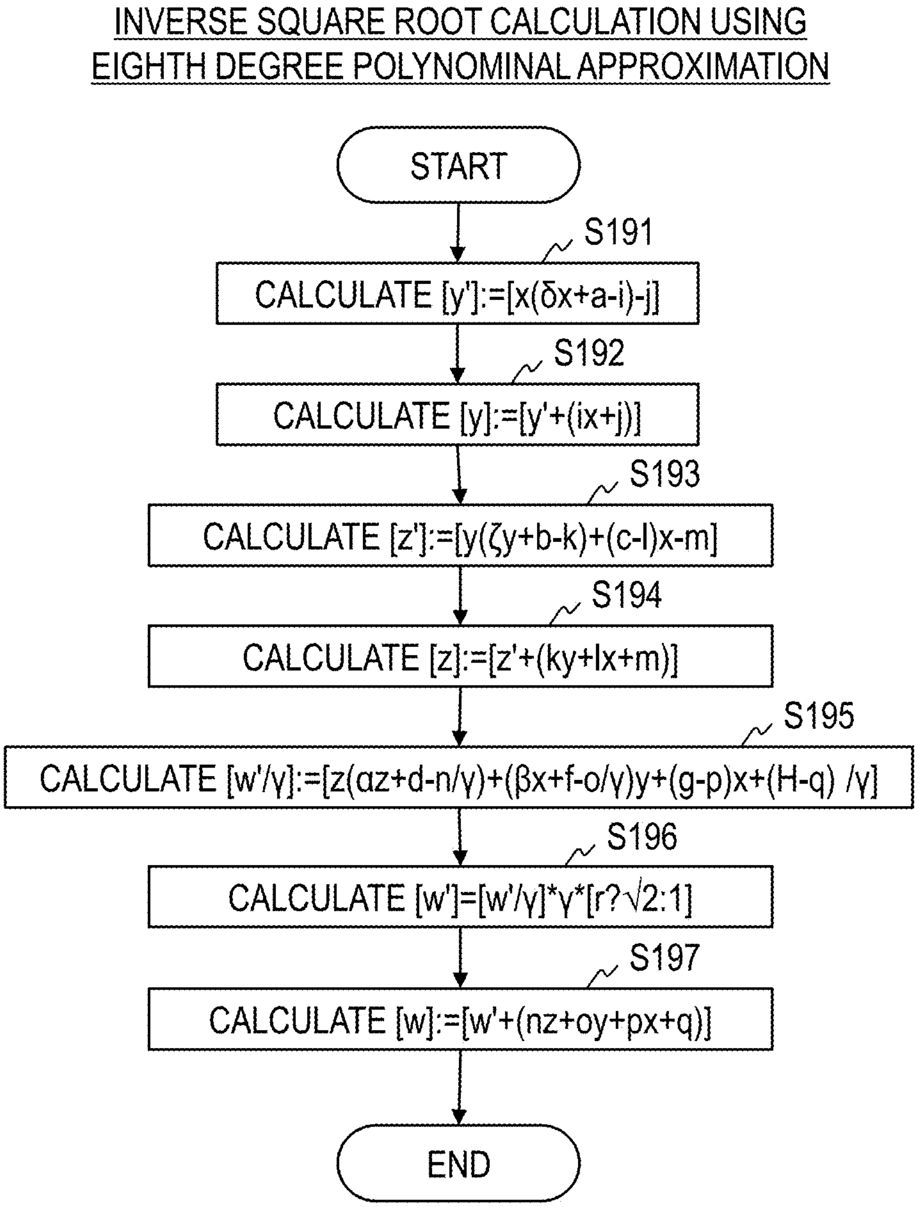
FIG. 5 is a diagram illustrating a processing procedure of the inverse square root calculation unit.

A processing procedure that is executed by the inverse square root calculation unit 19 will be described in detail with reference to FIG. 5.

Parameters a, b, c, d, f, g, H, i, j, k, l, m, n, o, p, q, α, β, γ, δ, and ζ for approximating the inverse square root function with an eighth degree polynomial are stored in the parameter storage unit 190. Each parameter is determined in advance according to a function to be approximated, and when the inverse square root function is approximated, values shown in Table 1 are set.

In step S191, the first sum-of-products unit 191 of the inverse square root calculation unit 19 calculates [y']:=[x(δx+a−i)−j] through a sum of products, and lowers the decimal point position through right shift. Here, x is a value b obtained by normalizing the value a. That is, [x]: =[b]. The first sum-of-products unit 191 outputs [y'] to the first addition unit 192.

In step S192, the first addition unit 192 of the inverse square root calculation unit 19 calculates [y]:=[y'+(ix+j)]. The first addition unit 192 outputs [y] to the second sum-of-products unit 193.

In step S193, the second sum-of-products unit 193 of the inverse square root calculation unit 19 calculates [z']:=[y(ζy+b−k)+(c−1)x−m] through a sum of products, and lowers a decimal point position through right shift. The second sum-of-products unit 193 outputs [z'] to the second addition unit 194.

In step S194, the second addition unit 194 of the inverse square root calculation unit 19 calculates [z]: =[z'+(ky+lx+m)]. The second addition unit 194 outputs [z] to the third sum-of-products unit 195.

In step S195, the third sum-of-products unit 195 of the inverse square root calculation unit 19 calculates [w'/γ]: =[z(az+d−n/γ)+(βx+f-o/γ)γ+(g−p)x+(H−q)/γ] through a sum of products. The third sum-of-products unit 195 outputs [w'/γ] to the selective product calculation unit 196.

In step S196, the selective product calculation unit 196 of the inverse square root calculation unit 19 executes algorithm 6 with a condition being [r] and options being √2γ and γ. That is, using the share value {r} of the multiplication flag r, [w']:=[w'/γ]*√2γ is calculated when r=1, and [w']:=[w'/γ] *γ is calculated when r=0. The selective product calculation unit 196 outputs [w'] to the third addition unit 197.

In step S197, the third addition unit 197 of the inverse square root calculation unit 19 calculates [w]: =[w'+(nz+oy+px+q)].

Modification Example: Secure Normalization System

The secure inverse square root computation system 100 of the embodiment is configured to execute both normalization for inverse calculation of a square root (algorithm 3) and inverse calculation of a square root (algorithm 4). A secure normalization system of the modification example is configured to execute only a part of the secure inverse square root computation system 100 that performs normalization (algorithm 3) for the inverse calculation of the square root. That is, the secure normalization system receives a share value [a] of a value a, and outputs a share value [b] of a value b obtained by normalizing the value a to [0.5, 1), and a share value [c'] of a normalization multiplier c', and a share value [r] of a multiplication flag r. Specifically, the secure computation apparatus $\mathbf{1}_n$ included in the secure normalization system of the modification example includes a bit decomposition unit 11, a first bit sequence generation unit 12, a flag sequence generation unit 13, a normalization multiplier generation unit 14, a second bit sequence generation unit 15, a flag calculation unit 16, a flag conversion unit 17, and a normalization unit 18.

Although the embodiments of the present invention have been described above, a specific configuration is not limited to these embodiments, and even when a design is appropriately changed without departing from the spirit of the present invention, it is obvious that this is included in the present invention. Various processing described in the embodiments may be not only executed in chronological order according to order of description, but may also be executed in parallel or individually according to a processing capacity of an apparatus that executes processing or as necessary.

Program and Recording Medium

Figure 6:
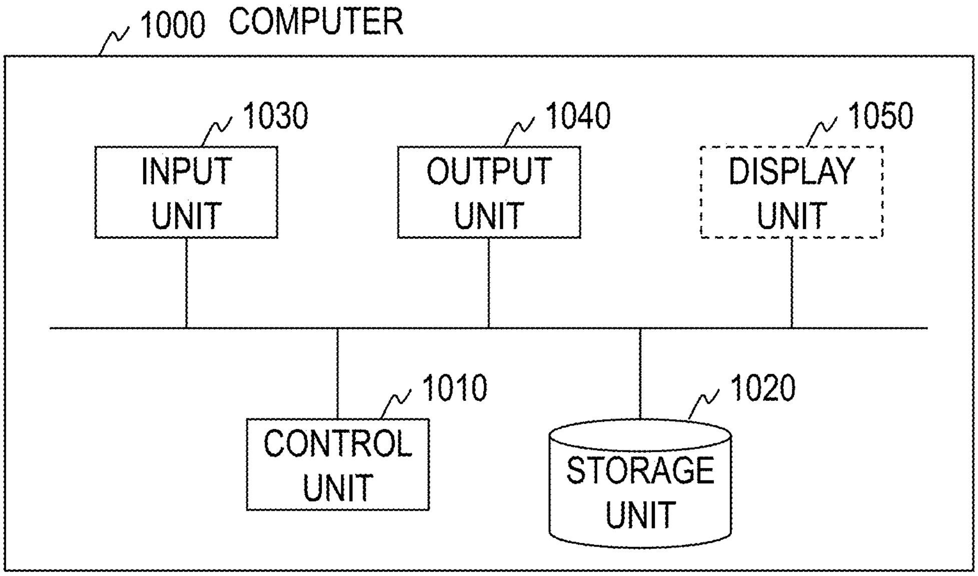
FIG. 6 is a diagram illustrating a functional configuration of a computer.

When various processing functions in each apparatus described in the above embodiment are realized by a computer, processing content of the function to be included in each apparatus is described by a program. This program is loaded into a storage unit 1020 of a computer illustrated in FIG. 6 and a control unit 1010, an input unit 1030, an output unit 1040, and the like are operated according to the program so that various processing functions in each of the above apparatuses are realized on the computer.

A program in which processing content thereof has been described can be recorded on a computer-readable recording medium. The computer-readable recording medium may be, for example, a magnetic recording device, an optical disc, a magneto-optical recording medium, or a semiconductor memory.

Further, distribution of this program is performed, for example, by selling, transferring, or renting a portable recording medium such as a DVD or CD-ROM on which the program has been recorded. Further, the program may be distributed by being stored in a storage device of a server computer and transferred from the server computer to another computer via a network.

The computer that executes such a program first temporarily stores, for example, the program recorded on the portable recording medium or the program transferred from the server computer in a storage device of the computer. When the computer executes the processing, the computer reads the program stored in the recording medium of the computer and executes processing according to the read program. Further, as another embodiment of the program, the computer may directly read the program from the portable recording medium and execute the processing according to the program, and further, processing according to a received program may be sequentially executed each time the program is transferred from the server computer to the computer. Further, a configuration may be adopted in % filch the above-described processing is executed by a so-called application service provider (ASP) type service for realizing a processing function according to only an execution instruction and result acquisition without transferring the program from the server computer to the computer. It is assumed that the program in the present embodiment includes information provided for processing of an electronic calculator and being pursuant to the program (such as data that is not a direct command to the computer, but has properties defining processing of the computer).

Further, in this embodiment, although the present apparatus is configured by a predetermined program being executed on the computer, at least a part of processing content of thereof may be realized by hardware.

The invention claimed is:

1. A secure inverse square root computation system for receiving a share value [a] of a value a as an input, and calculating a share value [1/√a] of the inverse of the square root of the value a, the secure inverse square root computation system comprising:

a plurality of secure computation apparatuses, wherein

λ is a decimal point position of the value a, λ' is the smallest integer equal to or greater than λ/2, and λ" is the largest integer equal to or smaller than λ/2, each secure computation apparatus works in cooperation with others of the plurality of secure computation apparatuses via communications including transmitting and receiving share values over a network, and each of the plurality of secure computation apparatuses comprises:

bit decomposition circuitry configured to generate a first sequence of share values $\{a_0\}, \ldots, \{a_{\lambda-1}\}$ of a bit representation $a_0, \ldots, a_{\lambda-1}$ of the value a from the share value [a];

first bit sequence generation circuitry configured to obtain, for each i where i is an integer equal to or greater than 0 and smaller than λ", a share value $\{a'_i\}$ of a bit $a'_i$ by calculating a logical sum of a share value $\{a_i\}$ and a share value $\{a_{i+1}\}$ of the first sequence of share values to generate a second sequence of share values $\{a'_0\}, \ldots, \{a'_{\lambda-1}\}$ of a bit sequence $a'_{\lambda'-1}, \ldots, a'_{\lambda-1}$;

flag sequence generation circuitry configured to generate a third sequence of share values $\{x_0\}, \ldots, \{x_{\lambda'-1}\}$ of a flag sequence $x_0, \ldots, x_{\lambda'-1}$ indicating the most significant bit of the second sequence of share values $\{a'_0\}, \ldots, \{a'_{\lambda'-1}\}$;

normalization multiplier generation circuitry configured to generate a share value [c'] of a normalization multiplier c' obtained by bit-connecting the third sequence of share values $\{x_0\}, \ldots, \{x_{\lambda'-1}\}$ in reverse order;

second bit sequence generation circuitry configured to set a share value $\{a''_i\}$ of a bit $a''_i$ as a share value $\{a_{2i}\}$ of the first sequence of share values for each i where i is an integer equal to or greater than 0 and smaller than λ", to generate a fourth sequence of share values $\{a''_0\}, \ldots, \{a''_{\lambda'-1}\}$ of a bit sequence $a''_0, \ldots, a''_{\lambda'-1}$;

flag calculation circuitry configured to sum each product $\{x_j\}$ $\{a''_j\}$ of share values $\{x_j\}$ of the third sequence of share values and a share value $\{a''_j\}$ of the fourth sequence of share values, where j is an integer equal to or greater than 0 and smaller than λ', to calculate a share value {r} of a multiplication flag r;

flag conversion circuitry configured to convert the share value {r} of the multiplication flag r into a share value [r] of the multiplication flag r through mod p conversion;

normalization circuitry configured to use the share value [a], the share value [c'], and the share value {r} to calculate [c'][c'][2a] when the multiplication flag r is 1 and [c'][c'][a] when the multiplication flag r is 0 to calculate a share value [b];

inverse square root calculation circuitry configured to use the share value [b] and the share value [r] to calculate [1/√b]*√2 when the multiplication flag r is 1 and [1/√b] when the multiplication flag r is 0 to calculate a share value [w]; and inverse normalization circuitry configured to calculate the share value [1/√a] by multiplying the share value [w] by the share value [c'].

2. The secure inverse square root computation system according to claim 1, wherein a, b, c, d, f, g, H, i, j, k, l, m, n, o, p, q, α, β, γ, δ, and ζ are parameters for approximating a square root function with an eighth degree polynomial, and [x]:=[b] is assumed, and the inverse square root calculation circuitry includes:

a first sum-of-products circuitry configured to calculate [y']:=[x(δx+a−i)−j], first addition circuitry configured to calculate [y]:=[y'+(ix+j)], second sum-of-products circuitry configured to calculate [z']:=[y(ζy+b−k)+(c−1)x−m], second addition circuitry configured to calculate [z]:=[z'+(ky+1x+m)], third sum-of-products circuitry configured to calculate [w'/y]:=[z(αz+d−n/γ)+(βx+f−o/γ)y+(g−p)x+(H−q)/γ], selective product calculation circuitry configured to use the share value {r} to calculate [w'/γ]*√2γ when the multiplication flag r is 1 and [w'/γ]*γ when the multiplication flag r is 0 to obtain a calculation result [w']; and third addition circuitry configured to calculate [w]:=[w'+(nz+op+px+q)].

3. A secure normalization system for normalizing a share value [a] of a value a in order to calculate a share value [1/√a] of the inverse of the square root of the value a, the secure normalization system comprising:

a plurality of secure computation apparatuses, wherein

λ is a decimal point position of the value a, λ' is the smallest integer equal to or greater than λ/2, and λ" is the largest integer equal to or smaller than λ/2, each secure computation apparatus works in cooperation with others of the plurality of secure computation apparatuses via communications including transmitting and receiving share values over a network, and each of the plurality of secure computation apparatuses comprises:

bit decomposition circuitry configured to generate a first sequence of share values $\{a_0\}, \ldots, \{a_{\lambda-1}\}$ of a bit representation $a_0, \ldots, a_{\lambda-1}$ of the value a from the share value [a];

first bit sequence generation circuitry configured to obtain for each i, where i is an integer equal to or greater than 0 and smaller than λ", a share value $\{a'_i\}$ of a bit $a'_i$ by calculating a logical sum of a share value $\{a_i\}$ and a share value $\{a_i+1\}$ of the first sequence of share values to generate a second sequence of share values $\{a'_0\}, \ldots, \{a'_{\lambda-1}\}$ of a bit sequence $a'o, \ldots, a'_{\lambda-1}$;

flag sequence generation circuitry configured to generate a third sequence of share values $\{x_0\}, \ldots, \{x_{\lambda-1}\}$ of a flag sequence $x_0, \ldots, x_{\lambda'-1}$ indicating the most significant bit of the second sequence of share values $\{a'_0\}, \ldots, \{a'_{\lambda'-1}\}$;

normalization multiplier generation circuitry configured to generate a share value [c'] of a normalization multiplier c' obtained by bit-connecting the third sequence of share values $\{x_0\}, \ldots, \{x_{\lambda'-1}\}$ in reverse order;

second bit sequence generation circuitry configured to set a share value $\{a''_i\}$ of a bit $a''_i$ as a share value $\{a_{2i}\}$ of the first sequence of share values for each i where i is an integer equal to or greater than 0 and smaller than λ" to generate a fourth sequence of share values $\{a''_0\}, \ldots, \{a''_{\lambda'-1}\}$ of a bit sequence $a''_0, \ldots, a''_{\lambda'-1}$;

flag calculation circuitry configured to sum each product $\{x_j\}$ $\{a''_j\}$ of share values $\{x_j\}$ of the third sequence of share values and a share value $\{a''_j\}$ of the fourth sequence of share values, where j is an integer equal to or greater than 0 and smaller than A' to calculate a share value {r} of a multiplication flag r; and normalization circuitry configured to use the share value [a], the share value [c'], and the share value {r} to calculate [c'][c'][2a] when the multiplication flag r is 1 and [c'][c'][a] when the multiplication flag r is 0 to calculate a share value [b].

4. A secure inverse square root computation method executed by each secure computation apparatus of a plurality of secure computation apparatuses of a secure inverse square root computation system for receiving a share value [a] of a value a as an input, and calculating a share value [1/√a] of the inverse of the square root of the value a, [the] wherein each secure computation apparatus works in cooperation with others of the plurality of secure computation apparatus via communications including transmitting and receiving share values over a network, the secure inverse square root computation method comprising:

generating, by bit decomposition circuitry of the secure computation apparatus, a first sequence of share values $\{a_0\}, \ldots, \{a_{\lambda-1}\}$ of a bit representation $a_0, \ldots, a_{\lambda-1}$ of the value a from the share value [a];

obtaining, by first bit sequence generation circuitry of the secure computation apparatus, for each i where i is an integer equal to or greater than 0 and smaller than λ", a share value $\{a'_i\}$ of a bit $a_i$ by calculating a logical sum of a share value $\{a_i\}$ and a share value $\{a_{i+1}\}$ of the first sequence of share values to generate a second sequence of share values $\{a'_0\}, \ldots, \{a'_{\lambda'-1}\}$ of a bit sequence $a'_0, \ldots, a'_{\lambda'-1}$;

generating, by flag sequence generation circuitry of the secure computation apparatus, a third sequence of share values $\{x_0\}, \ldots, \{x_{\lambda'-1}\}$ of a flag sequence $x_0, \ldots, x_{\lambda'-1}$ indicating the most significant bit of the second sequence of share values $\{a'_0\}, \ldots, \{a'_{\lambda'-1}\}$;

generating, by normalization multiplier generation circuitry of the secure computation apparatus, a share value [c'] of a normalization multiplier c' obtained by bit-connecting the third sequence of share values $\{x_0\}, \ldots, \{x_{\lambda'-1}\}$ in reverse order;

setting, by second bit sequence generation circuitry of the secure computation apparatus, a share value $\{a''_i\}$ of a bit $a''_i$ as a share value $\{a_{2i}\}$ of the first sequence of share values for each i where i is an integer equal to or greater than 0 and smaller than 2", to generate a fourth sequence of share values $\{a''_0\}, \ldots, \{a''_{\lambda-1}\}$ of a bit sequence $a''_0, \ldots, a''_{\lambda'-1}$;

summing, by flag calculation circuitry of the secure computation apparatus, each product $\{x_j\}\{a''_j\}$ of share values $\{x_j\}$ of the third sequence of share values and a share value $\{a''_j\}$ of the fourth sequence of share values where j is an integer equal to or greater than 0 and smaller than λ' to calculate a share value {r} of a multiplication flag r;

converting, by flag conversion circuitry of the secure computation apparatus, the share value {r} of the multiplication flag r into a share value [r] of the multiplication flag r through mod p conversion;

using, by normalization circuitry of the secure computation apparatus, the share value [a], the share value [c'], and the share value {r} to calculate [c'][c'][2a] when the multiplication flag r is 1 and [c'][c'][a] when the multiplication flag r is 0 to calculate a share value [b];

using, by inverse square root calculation circuitry of the secure computation apparatus, the share value [b] and the share value [r] to calculate $[1/\sqrt{b}]*\sqrt{2}$ when the multiplication flag r is 1 and $[1/\sqrt{b}]$ when the multiplication flag r is 0 to calculate a share value [w]; and calculating, by inverse normalization circuitry of the secure computation apparatus, the share value $[1/\sqrt{a}]$ by multiplying the share value [w] by the share value [c'], wherein λ is a decimal point position of the value a, λ' is the smallest integer equal to or greater than λ/2, and λ" is the largest integer equal to or smaller than λ/2.

* * * * *